United States Patent Office 3,045,034
Patented July 17, 1962

3,045,034
PROCESS FOR PREPARING A FATTY OIL-POLY-HYDRIC ALCOHOL DIISOCYANATE REACTION PRODUCT
Erich Zankl and Reinhard Hebermehl, Leverkusen, Germany, assignors, by direct and mesne assignments, of one-half to Farbenfabriken Bayer Aktiengesellschaft, Leverkusen, Germany, a corporation of Germany, and one-half to Mobay Chemical Company, Pittsburgh, Pa., a corporation of Delaware
No Drawing. Filed Jan. 27, 1958, Ser. No. 711,123
Claims priority, application Germany Feb. 2, 1957
5 Claims. (Cl. 260—404.5)

This invention relates generally to the preparation of thixotropic oils and, more particularly, to an improved method for preparing thixotropic oils.

It is desirable to thicken dispersions of non-volatile substances in volatile substances without changing the concentration of either of the substances in the mixture. Such a process is particularly desirable in the paint industry where the desired proportions of ingredients produce a paint which is too thin for spreading properly over the surface to be painted. It has been proposed heretofore to convert such thin solutions into thixotropic liquids or gels by adding a thickening agent, such as, for example, a metallic stearate, or a swelling agent, such as, for example, a montmorillonite, to the liquid to be thickened. It has also been proposed to add a material which will react with one of the ingredients to form a thixotropic substance, such as, for example, adding a reactant to the mixture which will form a metallic soap from a pigment and fatty acids. These heretofore available methods of thickening a paint or similar liquid have not been entirely satisfactory, however, because it has been impossible in many cases to prepare a liquid of the desired viscosity without using undesirably large quantities of the thickening agent.

It is therefore an object of this invention to provide an improved method for preparing thixotropic oils. Another object of the invention is to provide a method for producing thixotropic oils from the conventional fatty oils used in the paint industry. Still another object of the invention is to provide an improved thixotropic fatty oil.

Generally speaking, the foregoing objects as well as others are accomplished in accordance with this invention by heating a fatty oil with a polyhydric alcohol in the presence of an esterification catalyst until re-esterification of the oil has been achieved and then reacting the re-esterification product with an organic diisocyanate in an amount which is at least substantially equivalent to the number of unreacted hydroxyl groups in the re-esterification product. Either the alcohol used in re-esterifying the fatty oil or the organic diisocyanate used to react with the re-esterification product, or both, must have a symmetrical molecular structure in order to achieve the result contemplated by this invention.

The process is adaptable to the thickening of either drying or non-drying fatty oils used in the paint industry which can be re-esterified by heating with a polyhydroxy alcohol. Such fatty oils contain fatty acids and their esters, usually a triglyceride. The invention contemplates the preparation of a thixotropic oil in accordance with the process described herein, regardless of the nature of the fatty oil; but it is preferred to treat drying oils in accordance with this invention. The term "fatty oils," as used herein and in the appended claims, is thus intended to include both drying and non-drying oils obtained from either plants or animals which contain fatty acids and their esters and are capable of being re-esterified by heating in the presence of an esterification catalyst with a polyhydric alcohol. This definition is consistent with the one of a fatty oil found in Hackh's Chemical Dictionary, third edition, published by McGraw-Hill Book Company, Inc.

Examples of oils which may be treated in accordance with this process to produce a thixotropic fatty oil include linseed oil, soyabean oil, wood oil or tung oil, oiticica oil, olive oil and the like.

The fatty oil may be re-esterified with any suitable polyhydric alcohol but either the polyhydric alcohol or the organic diisocyanate used to react with the re-esterification product must have a symmetrical structure. Polyhydric alcohols having a suitable symmetrical structure include, for example, trimethylol propane, perhydro-bis-phenol, 1,4-butane diol, 2,2-dimethyl propane diol-1,3, ethylene glycol, diethylene glycol, triethylene glycol, dipropylene glycol, tripropylene glycol, butene diol and butine diol and the like. Any suitable organic diisocyanate may be reacted with the product of the re-esterification step. An asymmetrical diisocyanate may be used if the alcohol had a symmetrical structure. Examples of suitable organic diisocyanates having a symmetrical molecular structure include toluylene-2,6-diisocyanate, diethylated toluylene diisocyanate, dicyclohexyl methane-4,4'-diisocyanate, 4,4'-cyclohexane diisocyanate, p-phenylene diisocyanate, m-xylylene diisocyanate, hexamethylene diisocyanate, 1,5-dimethyl-2,4-$\omega$-isocyanato methyl benzine and the like.

Although it is necessary for both the polyhydric alcohol and the organic diisocyanate to have a symmetrical molecular structure, it is sometimes preferred to use an alcohol and an organic diisocyanate having symmetrical structures in order to insure that the desired result will be obtained. Asymmetrical polyhydric alcohols, such as glycerine or the like, may be used, however, if one of the symmetrical organic diisocyanates is used. If the polyhydric alcohol has a symmetrical molecular structure, an asymmetrical diisocyanate, such as, for example, 2,4-toluylene diisocyanate, or any other suitable asymmetrical diisocyanate may be used.

The re-esterification of the oil with the polyhydric alcohol may be achieved by any conventional esterification process using any suitable esterification catalyst. Preferably, the maximum temperature during the re-esterification should be about 300° C. or less. Any suitable re-esterification catalyst may be used, such as, for example, fatty acid of linseed oil or lead oxide or the metal salts of organic acids, for instance, zinc octoate. Especially suited are the metal salts of naphthenic acids, such as, for example, lithium naphthenate and zinc naphthenate. Preferably, from about 0.5 mol to about 2.5 mols of the polyhydric alcohol per mol of oil should be used in the re-esterfiication process.

Best results are obtained if the re-esterification product is reacted with the organic diisocyanate while dispersed in a suitable organic solvent therefor. Any suitable organic solvent for the re-esterification product which will not react with the organic diisocyanate may be used, such as, for example, an aliphatic or aromatic hydrocarbon, an ester, ketone, styrene, or any of the other suitable solvents used in preparing lacquers or varnishes by the paint industry. Specific solvents are, for instance, benzine, benzene, xylene, toluene, styrene, ethyl acetate, butyl acetate, ethyl glycol acetate, methyl isobutyl ketone and cyclohexanone.

The amount of organic diisocyanate required will depend upon the amount of polyhydric alcohol used in the re-esterification process. The amount of organic diisocyanate should be such that the NCO groups are equivalent or substantially equivalent to the free hydroxyl groups present in the re-esterification product. It is possible, however, to use more or less than the equivalent amount of diisocyanate and it may frequently be desirable to use an excess of the diisocyanate to insure that all of the hydroxyl groups have been reacted with an NCO group. If an excess of an organic diisocyanate is used, the solvent may be an alcohol, such as methanol, ethanol, butanol or benzyl alcohol which will react with any NCO groups present after reaction with the re-esterification product and thus eliminate the reactive NCO groups from the product.

No definite explanation of the chemistry involved can be positively stated. However, the formation of the pronounced thixotropic effect obtained in accordance with this invention may be explained by the fact that in the reaction linear molecules having a rod-like or leaf-like structure are formed. The urethane groups of such molecules are capable of free rotation because of the lack of any stearic hindrance in the molecule. The molecules or their quasi-polymeric aggregates can approach that distance which is necessary for forming a gelled structure by way of secondary bonding mechanisms without any hindrance.

With suitable choice of the solvents or the mixtures thereof, the thixotropy is largely maintained also with increasing dilution and still occurs to an appreciable degree even with dispersions having a solid content of only a few percent.

The sol-gel conversion can be repeated as often as desired, regardless of whether the destruction of the supporting structure is effected mechanically or thermally.

When the new oils are mixed with other film formers, they are capable of transferring their effect to the latter, regardless of whether these dry physically or chemically. As regards the further processing, it is expedient to prepare the mixture by homogenization in solution. A pigmentation effected to the usual extent does not impair the thixotropic properties.

Thixotropic drying oils can be used in practice as film formers in clear or pigmented painting media, as the component transmitting the effect of thixotropy in combination with other film formers, such as, for example, alkyd resins, unsaturated polyesters, modified natural and phenolic resins, cellulose derivatives, oils or stand oils or as an addition to lacquers or enamels in order to prevent the settling of pigments.

Non-drying thixotropic oils can, for example, serve as plasticizers, especially for film formers which dry physically, to which they also impart good properties of plasticity as well as the thixotropic properties, or they can also be used as thickeners for solvents.

Example 1

About 884 parts by weight of soya oil and about 480 parts by weight of perhydro-bis-phenol are heated for about 5 hours at about 250° C. after adding about 0.5 part by weight of lithium naphthenate. About 460 parts by weight of diethylated toluylene-2,4-diisocyanate are added to the cooled re-esterification product. After about another 5 hours, the esterification is completed at about 120° C. A stiff gel-like mass with faint opalescence is formed.

The oil thus obtained is readily soluble in benzine and has a high degree of thixotropy. Films applied by brushing and containing driers are completely dry after about two hours.

Example 2

About 876 parts by weight of varnish-grade linseed oil are re-esterified with about 87 parts by weight of trimethylol propane within about 30 minutes at about 250° C. after adding about 0.5 part by weight of lithium naphthenate. After cooling, about 156 parts by weight of p-phenylene diisocyanate are added, the temperature is raised to about 120° C. and kept at this temperature until the complete reaction has occurred.

A thixotropic oil is formed which dries in about 3 hours when driers are added.

Example 3

About 876 parts by weight of varnish linseed oil are re-esterified at about 250° C. for about 30 minutes with about 87 parts by weight of trimethylol propane with addition of 0.5 part by weight of lithium naphthenate. After cooling, the product is diluted to about 50 percent with white spirit. About 170 parts by weight of toluylene-2,6-diisocyanate are added to this solution. The temperature is raised to about 120° C. and kept at this temperature until the reaction has been completed.

With the addition of driers to the oil which is formed, the said oil dries in about 4 hours to form a clear film and has a high degree of thixotropy in solution.

Example 4

About 876 parts by weight of varnish linseed oil and about 124 parts by weight of ethylene glycol are re-esterified within about 4½ hours at a temperature of about 200° C. with addition of about 0.5 part by weight of lithium naphthenate. The 50 percent solution in white spirit is reacted at about 120° C. with about 320 parts by weight of p-phenylene diisocyanate and is diluted towards the end of the reaction with xylene and butanol in a ratio of 1:1 to a solid content of about 40 percent, a residue of free NCO groups being simultaneously eliminated by reaction with the alcohol.

The oil which is formed has a reddish brown color, is thixotropic and after driers have been added, dries in about 4 hours to provide a clear film.

Example 5

About 876 parts by weight of varnish linseed oil and about 87 parts by weight of trimethylol propane, with addition of about 0.5 part by weight of lithium naphthenate, are heated to about 250° C., re-esterified for about 30 minutes and then cooled. About 162 parts by weight of cyclohexane-1,4-diisocyanate are added to the 50 percent solution in white spirit and the reaction is continued at about 120° C. until there is no longer any decrease in free NCO groups.

The concentration of the resulting solution is adjusted to a solid content of about 40 percent by adding xylene and butanol in a ratio of 3:1, the residue of excess isocyanate groups being converted by reaction with the OH groups. The light-colored oil which is formed is thixotropic and dries after adding driers to form matt films after about 3½ hours.

Example 6

About 884 parts by weight of soya oil are mixed with about 240 parts by weight of perhydro-bis-phenol, about 89 parts by weight of trimethylol propane and about 0.5 part by weight of lithium naphthenate, heated to about 250° C. and kept at this temperature for about 2 hours.

The re-esterification product is diluted with white spirit to a solid content of about 50 percent and reacted with about 460 parts by weight of diethylated toluylene diisocyanate at about 120° C. The reaction is completed after about 6 hours. The oil which is formed is clear, has thixotropic properties and dries in about 2 hours when driers are added.

Example 7

A mixture of about 436 parts by weight of wood oil and about 438 parts by weight of varnish linseed oil, after addition of about 0.5 part by weight of lithium naphthenate, is heated for about 2 hours at about 210° C. The 40 percent solution of the re-esterification product in white spirit is thereafter mixed with about 156 parts by weight of p-phenylene diisocyanate and heated to about 120° C. The reaction is completed after about 30 minutes.

The product forms a thixotropic oil of a medium brown color and slight haze, which produces clear films after about 45 minutes when driers are added.

Example 8

About 884 parts by weight of olive oil and about 87 parts by weight of trimethylol propane are re-esterified at about 250° C. with an addition of about 0.5 part by weight of lithium naphthenate. The product is cooled after about 1 hour and diluted to about 50 percent with white spirit. After adding about 156 parts by weight of phenylene diisocyanate, the temperature is raised again and the reaction of the components is completed at about 120° C.

A light-colored product is formed which is thixotropic, does not dry and can be used as an effective plasticizer.

*Example 9*

About 56 parts by weight of about a 50 percent solution of the oil according to Example 2 in white spirit are mixed with about 9.5 parts by weight of about a 75 percent solution of linseed oil alkyd resin (about 67 percent oil fraction) in white spirit and about 11.7 parts by weight of about a 60 percent solution of a maleonate resin (softening point about 106° C. to about 116° C.) in xylene and thereafter triturated with about 21.1 parts by weight of titanium dioxide.

The thixtropic enamel containing driers consisting of about 1.7 parts by weight of about a 25 percent solution of Co—Pb—Mn-naphthenate dries in about 2.5 hours to form a glossy film with a good hardness value.

*Example 10*

About 876 parts by weight of varnish linseed oil and about 124 parts by weight of ethylene glycol, with addition of about 0.5 part by weight of lithium naphthenate, are esterified for about 6 hours at about 200° C. and then cooled. About 432 parts by weight of 1,5-dimethyl-2,4-omega-isocyanto methyl benzene are added and reacted with the ester at a temperature of about 120° C. In the course of the exothermic reaction, the temperature reaches about 190° C., the NCO content drops within about 10 minutes to about zero. After cooling a thixotropic soft resin is obtained which melts at about 140° C. and which is miscible with alkyd resins at this temperature to form a homogeneous mass.

Although the invention has been described in considerable detail in the foregoing for the purpose of illustration, it is to be understood that such detail is solely for this purpose and that variations can be made by those skilled in the art without departing from the spirit and scope of the invention except as is set forth in the claims.

What is claimed is:

1. A method for preparing a thixotropic oil comprising re-esterifying a fatty oil with from about 0.5 mol to about 2.5 mols of a polyhydric alcohol per mol of oil in the presence of a metal salt of naphthenic acid and reacting the product thus obtained with an organic diisocyanate having —NCO groups as its only groups reactive with said product in an amount at least substantially equivalent to the existing hydroxyl groups, at least one of the said reactants other than the fatty oil having a symmetrical molecular structure.

2. The method of claim 1, wherein the alcohol is selected from the group consisting of trimethylol propane, ethylene glycol and perhydro-bis-phenol.

3. The method of claim 1 wherein the diisocyanate is selected from the group consisting of p-phenylene diisocyanate, dicyclohexyl methane-4,4'-diisocyanate and toluylene-2,6-diisocyanate.

4. The method of claim 1 wherein the re-esterification product is reacted with an excess of diisocyanate and an alcohol is present as solvent in the reaction mixture.

5. The process of claim 1 wherein both the polyhydric alcohol and the organic diisocyanate have a symmetrical molecular structure.

References Cited in the file of this patent

UNITED STATES PATENTS 2,812,337    Culemeyer _____ Nov. 5, 1957

UNITED STATES PATENT OFFICE
CERTIFICATE OF CORRECTION

Patent No. 3,045,034                      July 17, 1962

Erich Zankl et al.

It is hereby certified that error appears in the above numbered patent requiring correction and that the said Letters Patent should read as corrected below.

Column 2, line 24, for "Although it is necessary" read -- Although it is not necessary --.

Signed and sealed this 31st day of December 1963.

SEAL)
Attest:
ERNEST W. SWIDER                      EDWIN L. REYNOLDS

Attesting Officer                      Acting Commissioner of Patents